US012780188B2

(12) United States Patent
Koch et al.

(10) Patent No.: US 12,780,188 B2
(45) Date of Patent: Nov. 3, 2026

(54) METHOD FOR EXPANDING AN INFORMATION CLUSTER, AND METHOD FOR OPERATING A VEHICLE FLEET, ELECTRONIC TRAJECTORY GENERATION SYSTEM, VEHICLE FLEET SYSTEM AND COMPUTER PROGRAM PRODUCT

(71) Applicant: Volkswagen Aktiengesellschaft, Wolfsburg (DE)

(72) Inventors: Niklas Koch, Tappenbeck (DE); Jana Seeland, Wolfsburg (DE); Christian Hopp, Wolfenbüttel (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 115 days.

(21) Appl. No.: 18/690,703

(22) PCT Filed: Aug. 9, 2022

(86) PCT No.: PCT/EP2022/072344
§ 371 (c)(1),
(2) Date: Mar. 8, 2024

(87) PCT Pub. No.: WO2023/041255
PCT Pub. Date: Mar. 23, 2023

(65) Prior Publication Data

US 2024/0375644 A1 Nov. 14, 2024

(30) Foreign Application Priority Data

Sep. 14, 2021 (DE) .................... 10 2021 210 167.4

(51) Int. Cl.
*B60W 30/095* (2012.01)
*G08G 1/00* (2006.01)

(52) U.S. Cl.
CPC .... *B60W 30/0953* (2013.01); *B60W 30/0956* (2013.01); *G08G 1/20* (2013.01); *B60W 2520/10* (2013.01); *B60W 2552/05* (2020.02)

(58) Field of Classification Search
CPC ............ B62D 15/0285; G08G 1/0112; G08G 1/0129; G08G 1/20
See application file for complete search history.

(56) References Cited

U.S. PATENT DOCUMENTS

2015/0285645 A1* 10/2015 Maise .................. G08G 1/205 701/25
2017/0010106 A1 1/2017 Shashua et al.
(Continued)

FOREIGN PATENT DOCUMENTS

CN 107924620 A 4/2018
CN 112802346 A 5/2021
(Continued)

OTHER PUBLICATIONS

PCT/EP2022/069390. International Search Report (Nov. 2, 2022).
(Continued)

*Primary Examiner* — Anshul Sood
(74) *Attorney, Agent, or Firm* — Peter Zura; LOZA & LOZA, LLP

(57) ABSTRACT

Technologies and techniques for expanding an information cluster of a trajectory class. A trajectory is taken for a vehicle and a location-specific characteristic of the vehicle is acquired, and/or a vehicle-specific characteristic of the vehicle is acquired when taking the trajectory. The location-specific characteristic of the vehicle is provided and/or the vehicle-specific characteristic of the vehicle is provided. Additional steps include generating an actual trajectory by assigning the location-specific characteristic and/or the vehicle-specific characteristic to the taken trajectory, and comparing the actual trajectory with a comparison trajectory. The actual trajectory is assigned to one of two different trajectory classes depending on the comparison, such that the trajectory class into which the actual trajectory is classified is expanded in relation to its information cluster.

20 Claims, 4 Drawing Sheets

(56) References Cited

U.S. PATENT DOCUMENTS

| | | | | |
|---|---|---|---|---|
| 2018/0188031 | A1 | 7/2018 | Samper et al. | |
| 2018/0265130 | A1* | 9/2018 | Derendarz ............... | G08G 1/14 |
| 2018/0281859 | A1* | 10/2018 | Derendarz ............. | G08G 1/144 |
| 2020/0283023 | A1* | 9/2020 | Lally ................. | B60W 60/0025 |

FOREIGN PATENT DOCUMENTS

| | | | |
|---|---|---|---|
| CN | 112857387 | A | 5/2021 |
| DE | 102010023162 | A1 | 12/2011 |
| DE | 102016211180 | A1 | 3/2017 |
| DE | 102016216335 | A1 | 3/2018 |
| DE | 102016217330 | A1 | 3/2018 |
| DE | 102017112386 | A1 | 12/2018 |
| DE | 102017125710 | A1 | 5/2019 |
| DE | 102018113314 | A1 | 12/2019 |
| DE | 102019203187 | A1 | 9/2020 |
| DE | 102020200747 | A1 | 7/2021 |
| WO | 20210138616 | A1 | 7/2021 |

OTHER PUBLICATIONS

Priority Application No. DE 102021210167.4. Office Action (Mar. 31, 2022).

Corresponding Chinese Application No. 202280062262.3. Office Action (Aug. 14, 2026).

* cited by examiner

METHOD FOR EXPANDING AN INFORMATION CLUSTER, AND METHOD FOR OPERATING A VEHICLE FLEET, ELECTRONIC TRAJECTORY GENERATION SYSTEM, VEHICLE FLEET SYSTEM AND COMPUTER PROGRAM PRODUCT

The present application claims priority to International Patent Application No. PCT/EP2022/072344 to Koch et al., filed Aug. 9, 2022, titled "Method For Expanding An Information Cluster, And Method For Operating A Vehicle Fleet, Electronic Trajectory Generation System, Vehicle Fleet System And Computer Program Product," which claims priority to German Pat. App. No. DE 10 2021 210 167.4, filed Sep. 14, 2021, to Koch et al., the contents of each being incorporated by reference in their entirety herein.

TECHNICAL FIELD

The present disclosure relates to technologies and techniques for enhancing an information cluster, which describes at least one trajectory class including at least one trajectory to be driven by a vehicle. The present disclosure furthermore relates to a method for operating a vehicle fleet including at least two vehicles. The present disclosure also relates to an electronic trajectory generation system comprising at least one evaluation unit. The invention furthermore relates to a vehicle fleet system including at least two vehicles. And the present disclosure also relates to a computer program product.

BACKGROUND

During trained parking of at least semi-autonomously operated vehicles, a trajectory is trained during a training process. This trajectory can subsequently be followed by the vehicle. In principle, trajectories are taught-in ("teach-in") locally using the vehicle and used for following again ("redrive") using the same vehicle. To ensure that a trajectory can be used for a vehicle, the trajectory requires a reference point and a localization option of the vehicle in relation to the trajectory.

Data for training the trajectory can come from a variety of sources, such as, for example, data collected by the vehicle sensor system or data from other sources, such as Car-2-X.

During trained parking, an additional path to an established end position can be trained. Later, the vehicle can follow the trained route in an automated manner. In the process, the driver can be situated inside or outside the vehicle, or the vehicle drives autonomously. At present, other vehicles cannot use trajectories, or parts of trajectories, without location reference. Furthermore, vehicles that are not able to detect the absolute position thereof using conventional methods cannot use trajectories that have a fixed location reference, and the functions associated therewith. This may be the case, for example, when the vehicle is located in a tunnel, in a parking garage without special infrastructure, or in an area having GPS shadowing.

For example, DE 10 2017 112 386 A1 describes a method for providing stored data of a trained parking process for carrying out at least one subsequent parking process using the data, wherein the data of the trained parking process is generated by carrying out the entire parking process, or at least a part of the parking process, using a vehicle.

A method for carrying out an automated driving operation of a vehicle along a provided trajectory is known from DE 10 2016 211 180 A1, for example. In the process, at least one stored trajectory for a current position of the vehicle can be used.

DE 10 2018 113 314 A1, for example, describes a method for operating a driver assistance system, in which a motor vehicle is guided in an at least semi-automated manner. A trajectory for guiding the motor vehicle in an automated manner along the trajectory can be trained in a learning mode. Thereafter, the motor vehicle can be guided in an automated manner along the learned trajectory in an operating mode following the learning mode.

For example, DE 10 2019 203 187 A1 describes a parking assistance device for supporting a driver of a motor vehicle during a parking process.

It has been found that the following problems may arise with respect to the trained parking, particularly during an automated parking process:

- Case 1: Only data having no fixed location reference is available. As a result, it is not possible to process various trajectories from different sources.
- Case 2: Data having an imprecise or temporary location reference is available. An imprecise location reference shall be understood to mean that, for example, a localization within a parking deck is possible, but it is not possible to precisely determine which level of the parking garage is involved. A temporary location reference shall be understood to mean that the stored trajectory, for example for driving onto a ferry, is only valid when the ferry is in the port.
- Case 3: No additional information or data is available to compare various trajectories from different sources to one another and relate them to one another. The validity of shared trajectories and/or location references cannot be ensured.
- Case 4: Due to odometry errors, it is possible that existing trajectory data cannot be correctly processed and synchronized with one another.
- Case 5: Due to insufficient map data in parking facilities or other closed environments, additional context knowledge is missing for the valid processing and synchronization of trajectories.

SUMMARY

Aspects of the present disclosure are directed to improving the evaluation of the wide variety of trajectories of a wide range of vehicles, so that these trajectories can be utilized more comprehensively by the wide variety of vehicles for the wide variety of applications.

Some aspects are disclosed in the subject matter of the independent claims. Other aspects are disclosed collectively and/or individually in the subject matter of the respective dependent claims.

In some examples, a method is disclosed for enhancing an information cluster, which characterizes at least one trajectory class including at least one trajectory to be driven by a vehicle, comprising:

- negotiating at least one trajectory by way of at least one vehicle;
- at least temporarily detecting at least one location-specific characteristic of the vehicle and/or at least temporarily detecting at least one vehicle-specific characteristic of the vehicle during the negotiation of the trajectory;
- providing the at least one location-specific characteristic of the vehicle and/or the at least one vehicle-specific characteristic of the vehicle to an evaluation unit;

generating an information-enhanced actual trajectory by assigning the at least one location-specific characteristic of the vehicle and/or the at least one vehicle-specific characteristic of the vehicle to the negotiated trajectory;

comparing the information-enhanced actual trajectory to at least one comparison trajectory in an evaluation unit, wherein the at least one comparison trajectory is provided by at least one fleet vehicle of a vehicle fleet which differs from the vehicle; and assigning the information-enhanced actual trajectory to one of at least two different trajectory classes depending on the comparison, so that the at least one trajectory class into which the information-enhanced actual trajectory is classified is enhanced with respect to the information cluster thereof.

Using such techniques, a wide range and a wide variety of different trajectories that were recorded by a wide variety of vehicles of a vehicle fleet, in particular by a wide variety of sensor systems, can be used more comprehensively by the vehicles of the vehicle fleet. By assigning the information-enhanced actual trajectory to at least one of the two different trajectory classes, it is possible to achieve trajectories that previously, for example, for the reasons highlighted in Cases 1 to 5, could not be used, or could only be used incompletely, can nonetheless be used as a result of the classification. In other words, the described methods can prevent trajectories that contain imprecise or missing information from remaining without consideration or from being discarded or even from being erased.

Consequently, available trajectories that are provided by the vehicles of the vehicle fleet can be preprocessed so as to be usable for the vehicles of the vehicle fleet. For example, trajectories previously rated as "poor" can nonetheless be used by the described method, thereby preventing that such a "poor" trajectory is discarded or wasted. In this way, a comprehensive and detailed data collection of a wide variety of trajectories can be created, so that individual trajectories can be made available more accurately and more precisely for vehicles, since individual trajectories can be assigned more efficiently as a result of the information-enhanced trajectory classes, and thereby added value in terms of information can be provided.

In some examples, the described method can be a computer-implemented method.

In some examples, a vehicle fleet system is disclosed, including at least two vehicles, which each comprise a transceiver unit, comprising at least one electronic trajectory generation system according to the preceding aspect or an advantageous refinement thereof. Using the vehicle fleet system, it is possible to manage the vehicle fleet composed of several vehicles.

For example, the vehicle fleet system can be a central server device or a back-end or a data cloud or a vehicle fleet server.

Each of the vehicles of the vehicle fleet may include at least one transceiver unit. In this way, data can be exchanged between the vehicle fleet system and the vehicles. The information regarding trajectories and/or trajectory-specific features can thus be transmitted. The vehicle fleet system may include at least one electronic trajectory generation system by way of which a trajectory class can be enhanced in terms of the information clusters thereof. It is likewise conceivable that each vehicle of the vehicle fleet comprises at least one sub-system of the electronic trajectory generation system.

It is likewise conceivable that each vehicle itself comprises an electronic trajectory generation system, so as to be able to generate and enhance trajectories itself in that the particular information is transferred or transmitted to the particular vehicles by the vehicle fleet system.

Another aspect of the present disclosure relates to a computer program product, encompassing commands which, during the execution of the computer program product by a computer, prompt the computer to carry out any of the methods according to any one of the preceding aspects or an advantageous embodiment thereof.

Advantageous embodiments of the independent methods should be regarded as advantageous embodiments of the electronic trajectory generation system, of the vehicle fleet system, and of the computer program product. The electronic trajectory generation system, the vehicle fleet system, and the computer program product furthermore comprise present features that allow one of the independent methods or an advantageous embodiment thereof to be carried out.

Advantageous exemplary embodiments may be regarded as advantageous exemplary embodiments of the other aspects, and vice versa. In particular, advantageous exemplary embodiments of one aspect may be regarded as advantageous exemplary embodiments of the other aspects or all other aspects. This likewise applies vice versa.

Here and hereafter, a detection system or surroundings sensor system may be understood to mean a sensor system that is able to generate sensor data or sensor signals mapping, representing or reflecting a surrounding area of the vehicle and/or of the surroundings sensor system. In particular, the ability to detect electromagnetic or other signals from the surrounding area is not sufficient to consider a sensor system as a surroundings sensor system. For example, cameras, radar systems, LIDAR systems or ultrasonic sensor systems can be interpreted as surroundings sensor systems.

An evaluation unit or processing unit may be understood to mean a data processing device, and the evaluation unit can thus, in particular, process data for carrying out arithmetic operations. This possibly also encompasses operations for carrying out indicated accesses to a data structure, for example a look-up table (LUT).

The evaluation unit may include one or more computers, one or more microcontrollers and/or one or more integrated circuits, for example, one or more application-specific integrated circuits (ASIC), one or more field-programmable gate arrays (FPGA) and/or one or more single-chip systems (system on a chip (SoC)). The evaluation unit can also include one or more processors, for example, one or more microprocessors, one or more central processing units (CPU), one or more graphics processing units (GPU) and/or one or more signal processors, in particular one or more digital signal processors (DSP). The evaluation unit can also include a physical or virtual network of computers or others of the aforementioned units.

In various exemplary embodiments, the evaluation unit includes one or more hardware and/or software interfaces and/or one or more memory units.

A memory unit can be configured as a volatile data memory, for example as a dynamic random access memory (DRAM), or as a static random access memory (SRAM), or as a non-volatile data memory, for example as a read-only memory (ROM), as a programmable read-only memory (PROM), as an erasable read-only memory (EPROM), as an electrically erasable read-only memory (EEPROM), as a flash memory or a flash EEPROM, as a ferroelectric random access memory (FRAM), as a magnetoresistive random access memory (MRAM), or as a phase-change random access memory (PCRAM).

A method described herein may also be present in the form of a computer program product, which implements the method on a control unit when being executed on the control unit. Likewise, an electronically readable data carrier having electronically readable control information saved thereon may be present, encompassing at least one described computer program product and being configured so as to carry out a described method when the data carrier is used in a control unit.

The present disclosure also encompasses refinements of the electronic trajectory generation system according to the invention, of the vehicle fleet system according to the invention, and of the computer program product which include features such as have already been described in connection with the refinements of the method according to the invention. For this reason, the corresponding refinements of the electronic trajectory generation system according to the invention, of the vehicle fleet system according to the invention, and of the computer program product are not described here for the purposes of brevity.

The present disclosure also encompasses the combinations of the features of the described embodiments.

DESCRIPTION OF THE DRAWINGS

Exemplary embodiments of the invention are described hereafter. In the drawings.

DETAILED DESCRIPTION

Figure 1:
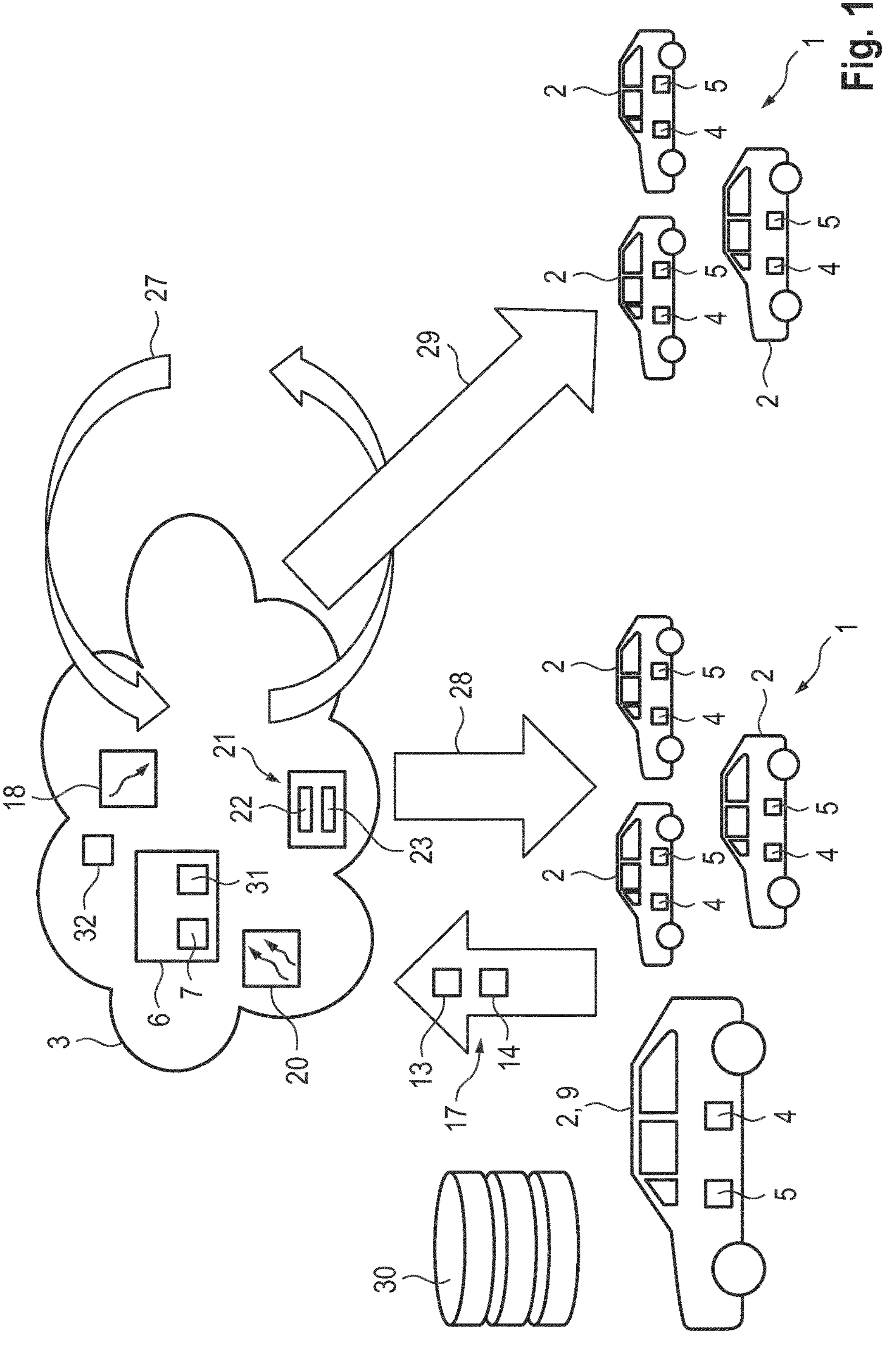
FIG. 1 shows a schematic illustration of a vehicle fleet and of a vehicle fleet system, which comprises an electronic trajectory generation system, according to some aspects of the present disclosure.

The exemplary embodiments described hereafter are preferred exemplary embodiments of the invention. In the exemplary embodiments, the described components in each case represent individual features of the invention which are to be considered independently of one another and which each also refine the invention independently of one another and, as a result, shall also be considered to be an integral part of the invention, either individually or in a combination other than the one shown. Furthermore, the described exemplary embodiments can also be supplemented with additional of the above-described features of the invention.

In the figures, functionally equivalent elements are each denoted by the same reference numerals.

In some examples described herein, recorded trajectories can be enhanced in terms of the informational content by the at least one location-specific characteristic and/or the at least one vehicle-specific characteristic. In this way, the generated actual trajectory, compared to the negotiated trajectory, includes several pieces (portions) of information, and in particular more comprehensive information. Consequently, the quality of the actual trajectory can be increased so that the actual trajectory can be referred to as an improved trajectory compared to the negotiated trajectory. In this way, comprehensive and more application-friendly information can be made available by way of the actual trajectory. Moreover, additional information with respect to the negotiated trajectory can additionally be made available to the vehicle by way of this actual trajectory, so that the vehicle can internally enhanced the saved information thereof. Likewise, this actual trajectory can be made available to further vehicles of the vehicle fleet.

In particular, it is possible, based on the assigned information-enhanced actual trajectory, to unambiguously locate the negotiated trajectory of the vehicle, in particular the space, since, in addition to the location coordinates, for example, additional data, such as the location-specific and/or vehicle-specific characteristics, are detected. In this way, a wide variety of information that was in particular detected by vehicles themselves. or that was provided, can be added to a particular trajectory. As a result, a trajectory can be created more comprehensively, and in particular more intelligently. This may be understood as an information-enhanced actual trajectory.

This additional information regarding the location-specific characteristic and/or the vehicle-specific characteristic can be added to the particular trajectory as additional data. This additional data can, for example, be used for locating the vehicle later on, for verifying or checking a position of the vehicle, or for comparing trajectories.

Consequently, the methods described herein can be used to achieve that a wide variety of trajectories are combined and "matched" by way of data recorded by the vehicle along the trajectory. In particular, the location-specific and/or vehicle-specific characteristics can be detected or recorded synchronously with the negotiated trajectory. As a result, trajectories can be compared and corrected based on the location-specific and/or vehicle-specific characteristics, for example so as to obtain a fixed location reference of the trajectory and/or of the vehicle. Furthermore, a selectivity of trajectories having similar locations and different location references, such as an unknown, a flawed or an imprecise trajectory, can be considerably improved. In particular, the location-based data, in terms of the location-specific and/or vehicle-specific characteristics, can refer to the trajectory, a coordinate system, such as a parking garage coordinate system, or to a global coordinate system, such as "WGS84."

For example, it is possible that the vehicle has negotiated or recorded the trajectory in an area in which no common or known vehicle self-localization is available. In this case, the trajectory would not be usable. Advantageously, the described method may be employed here, so that trajectories, for example having no location reference, are made available across vehicles and rendered usable by referencing semantics with respect to the location-specific and/or vehicle-specific characteristics.

Moreover, an accuracy or a quality of a traditional or known localization method can be improved, supported and/or verified by the location-specific and/or vehicle-specific characteristics, which, for example, can be used for localization along the trajectory. In the process, in particular information such as the location-specific and/or vehicle-specific characteristics, which are not suitable for conventional global localization systems, is used. The location-specific and/or vehicle-specific characteristics may be, for example, information without a global location reference, which, however, relate to trajectories and/or other features.

For example, when a ramp is being driven, the angle of inclination and/or the acceleration of the vehicle may characteristically change in such a way that this information can be used for assigning a feature, that is, as a location-specific or vehicle-specific characteristic. In addition to vehicle data or vehicle dynamics features, it is also possible to use other characteristic features outside the vehicle, which can be recognized by way of surroundings sensor systems, such as a camera, ultrasonic sensors, or radar sensors.

In some examples, the negotiated trajectory can be 1 kilometer, 500 meters, 100 meters, 50 meters, or 50 kilometers. In some examples, the trajectory can be an interval between 10 meters and 100 kilometers. In particular, any values within this interval can be taken into consideration for the trajectory.

Specifically, the negotiated trajectory can involve short routes within a parking lot or a parking area. For example, the negotiated trajectory may be understood as a progression of the route to a destination parking lot.

The trajectory may be configured to have a starting point and an end point or a destination point. The vehicle thus follows the trajectory from a starting point to an end point. The negotiated trajectory of the vehicle may be a trajectory possibly having reduced suitability, which is less suitable based on the above-described Cases 1 to 5.

While, or as, the trajectory is being driven or negotiated, the location-specific and/or vehicle-specific characteristics can be detected at least temporarily, and in particular continuously. The location-specific and/or vehicle-specific characteristics can be detected at arbitrary locations or positions between the starting point and the end point of the trajectory. The location-specific and/or vehicle-specific characteristics can be detected at predefined trajectory spots located between the starting point and the end point of the trajectory. For example, the location-specific and/or vehicle-specific characteristics can be detected at predefined time spans or time intervals. It is likewise conceivable that location-specific and/or vehicle-specific characteristics are continuously recorded while the trajectory is being driven. Likewise, it may be predefined that a predefined number of location-specific and/or vehicle-specific characteristics is detected as a function of a length and/or a type of a trajectory.

An information cluster may be understood to mean any information or any data enhancing or augmenting the informational content of a trajectory.

For example, an information cluster or a piece (portion) of cluster information may be understood to mean a location, a vehicle parameter, such as a speed in a trajectory section, a steering angle, a pitch angle, a yaw angle, a roll angle, or a transverse acceleration. Likewise, an information cluster may be understood to mean a progression of the trajectory, a length of the trajectory, a number of curves within the trajectory and/or curve radii with respect to the trajectory. In particular, an information cluster may be understood to mean a wide variety of information by way of which a trajectory can be improved, and thus enhanced, in terms of the informational content thereof and/or the informational meaningfulness thereof. The aforementioned examples shall not be construed to be exhaustive, but are merely intended to provide insight with respect to the information cluster.

The location-specific and/or vehicle-specific characteristics can be transmitted or provided to the evaluation unit via communication links. The evaluation unit can be an evaluation system comprising several units, for example. The evaluation unit can be, for example, part of a back-end or of an electronic vehicle trajectory generation system. It is likewise conceivable that the evaluation unit is at least partially integrated into the vehicle. Using the evaluation unit, which can, for example, be referred to as an electronic evaluation unit, the information-enhanced actual trajectory can be generated. Using the evaluation unit, the information-enhanced actual trajectory can be compared to at least one information-enhanced comparison trajectory or can be evaluated or be assessed.

The comparison trajectory may be understood as a reference trajectory or as an accumulation of provided trajectories of the other vehicles of the vehicle fleet. In particular, all of the data of the vehicles of the vehicle fleet which is made available may be understood as a comparison trajectory, so that a comprehensive comparison trajectory can be made available. The information-enhanced actual trajectory can, for example, be assigned by way of the evaluation unit to one of the at least two, and in particular several, different and, for example predefined, trajectory classes. The trajectory classes can be usage extensions or suitability extension classes, for example. The information-enhanced actual trajectory, and thus also the trajectory driven by the vehicle, can thus be enhanced or improved in terms of the informational content thereof. In other words, a rating or classification of the actual trajectory is carried out by way of the evaluation unit. By assigning and, for example adding, the actual trajectory to an associated trajectory class, this trajectory class can be enhanced or improved in terms of the informational content thereof or the information cluster thereof. In particular, an improved, information-enhanced trajectory class can be generated by assigning the information-enhanced actual trajectory to an associated trajectory class. This trajectory class can, in turn, be used for later trajectories of other vehicles.

For example, a piece (portion) of driving dynamics information of the vehicle, such as braking, acceleration, transverse acceleration, ESP data, recognition of ramps based on an uphill grade and/or a downhill grade, vertical dynamics or an erroneous path can be detected as the location-specific characteristic. Likewise, a use of prominent vehicle systems, such as turn signal, lighting, window lift mechanism, door, mirror adjustment, gear selection, parking brake, hill-holder, activation and deactivation of assistance functions, or electrical charging or refueling with fossil fuels can be detected as a vehicle-specific characteristic. Likewise, a driving maneuver, such as a characteristic route segment or driving maneuvers that can only occur at certain spots of a parking level, can be detected as a vehicle-specific characteristic.

For example, a location-specific characteristic may be understood to mean a piece (portion) of information of a surroundings sensor system of a vehicle, such as a camera, an ultrasonic sensor, a radar sensor or a LIDAR sensor. Furthermore, an identified ambient feature, such as a landmark, a sign, a marker, an infrastructure, a ground marking, a parking space numbering, a bumper, a gate, a charging station, a payment terminal, a toll booth, a control station, a business or a structure in the ground or a marker in the non-visible light range, or a roadway marking, or a gas station, or a specific curve, a traffic light or ground properties of a road may be detected as the location-specific characteristic. Likewise, a recognized information infrastructure, such as a WLAN network, a mobile communication network or RFID text, can be detected as the location-specific characteristic.

The examples just listed with respect to the location-specific characteristics and the vehicle-specific characteristics are only intended to provide minor insight into the multitude of information, and shall therefore not be construed to be exhaustive.

In some examples, the at least two trajectory classes may be distinguished with respect to a driving location and/or a driving theme and/or a vehicle speed while the vehicle is driving and/or a roadway type. The distinction or the categorization of the individual trajectory classes can be carried out by the evaluation unit or by an electronic processing unit or a control unit. By distinguishing the at least two trajectory classes, or several trajectory classes, it can be achieved that the respective actual trajectory can be assigned to the associated or matching trajectory class here based on the vehicle-specific and/or location-specific characteristics. In this way, it is possible to accurately and precisely assign the actual trajectory to an associated trajectory class.

In particular, the trajectory classes may be typed by way of the evaluation unit based on location-specific and/or vehicle-specific and/or trajectory-specific characteristics. In this way, it can be achieved that the actual trajectory, which is compared to the comparison trajectory based on the location-specific and/or vehicle-specific characteristics, can be assigned to a matching trajectory class. By distinguishing the trajectory classes, a wide variety of trajectories can be specified based on the wide range of features, and cab thus be categorized.

A driving location should be understood to mean whether specific ambient features were able to be detected during the negotiation of the trajectory. In particular, the driving location may be understood to involve enclosed driving, such as, for example, in a tunnel or in a parking garage. Likewise, the driving location may be understood to involve non-enclosed driving, such as driving on a rural road or an expressway. The driving theme may, for example, distinguish a parking process or a maneuvering process as compared to driving "freely," such as driving along an expressway or a rural road. When the cases of the trajectory classes are distinguished by the vehicle speed, the particular vehicle speed at which, for example, the trajectory was driven, can be compared based on a speed threshold value or a predefined tolerance value. In this way, the trajectory classes can be categorized as to whether a speed is greater than or equal to the speed threshold value. Furthermore, for distinguishing the trajectory classes in terms of a roadway type, the distinction may be made as to whether the trajectory was carried out along an expressway or a federal highway or a rural road or a city road or a parking garage road. Consequently, the trajectory classes can be specified in such a way that accurate and efficient typing of a wide variety of trajectories can be carried out.

The driving location may, for example, be understood to mean a parking lot at a rest stop, or a parking lot at a charging station or gas pump.

In some examples, the information-enhanced actual trajectory may be evaluated, at least based on the type of at least one characteristic and/or based on at least the number of the characteristics and/or based on the trajectory, as to the trajectory class with which an association is found. In particular, the information-enhanced actual trajectory is evaluated by way of the evaluation unit so that a differentiated evaluation or assessment of the actual trajectory can be carried out by way of the evaluation unit. The actual trajectory can be evaluated based on a wide variety of information and/or features and/or characteristics so that an accurate and/or precise categorization or classification of the actual trajectory can be carried out, and the actual trajectory can thus be assigned to a trajectory class that corresponds to the actual trajectory. It may be important in the process that only actual trajectories that have an association or an agreement are assigned to a trajectory class. In this way, it can be achieved that in fact an information cluster of a trajectory class can be enhanced. It is particularly advantageous when the evaluation unit evaluates the actual trajectory to be evaluated based on the type of the location-specific characteristic and/or of the vehicle-specific characteristic and/or based on at least a number of the location-specific characteristics and/or of the vehicle-specific characteristics. Likewise, the negotiated trajectory can be taken into consideration for the evaluation. For example, a starting point and/or an end point and/or a stopover along the trajectory can be taken into consideration. Likewise, a shape and/or a length and/or a time duration of the driven trajectory can be taken into consideration.

In some examples, at least the type and/or the number of characteristics of the information-enhanced actual trajectory are compared to the type and/or the number of characteristics of the at least one comparison trajectory of a trajectory, and, if at least the type and/or the number differ, the information-enhanced actual trajectory is then classified into at least this trajectory class. By taking at least one difference between the trajectories into consideration, it can be achieved that only trajectories that provide added value are classified into a trajectory class. In this way, it can be prevented, for example, that a trajectory that was already unambiguously assigned into the trajectory class is added again. This way, computing capacity can be decreased. Only trajectories that enhance the trajectory class with respect to additional information or provide added value are to be assigned or added to the trajectory class, so that the trajectory class can be improved based on the informational content thereof. So as to be able to achieve this, the actual trajectory can be compared to the comparison trajectory as to the extent to which these two trajectories differ in terms of the location-specific and/or vehicle-specific characteristic thereof.

For example, it is possible that the two trajectories are identical in terms of the location-specific characteristics, but differ in terms of the vehicle-specific characteristic thereof. This way, a certain level of added value would be achieved for the trajectory class. Likewise, it may be that the two trajectories in each case have an identical first location-specific characteristic, but differ in at least a second characteristic. Likewise, it may be that the comparison trajectory in each case has two location-specific and vehicle-specific characteristics, but the actual trajectory in each case has five location-specific and vehicle-specific characteristics. The two trajectories thus differ in the additional characteristics, and the actual trajectory can thus be assigned to the trajectory class or classified as an information enhancement.

In particular, a predefined tolerance value or a predefined tolerance threshold can be taken into consideration for distinguishing between the actual trajectory and the comparison trajectory. In this way, it is possible to establish, for example, when the actual trajectory and the comparison trajectory are identical, or substantially identical. This is the case, for example, when the two trajectories have a deviation smaller than a predefined tolerance value. In this way, a more detailed and more precise distinction with respect to the characteristics of the two trajectories can be made.

In some examples, at least one type of a characteristic of the information-enhanced actual trajectory may be compared to at least an identical type of a characteristic of the comparison trajectory, and, at least when the compared types deviate by a tolerance value smaller than a threshold value, the information-enhanced actual trajectory is classified at least into the trajectory class in which the comparison trajectory is contained. In particular, the actual trajectory and the comparison trajectory may be evaluated or assessed or compared by way of the evaluation unit by comparing one type of the characteristic of the actual trajectory to a characteristic containing the same type as the type of the characteristic of the actual trajectory.

For example, at least one type of the characteristic of the actual trajectory may be a steering angle or a vehicle dynamics parameter of the vehicle. It is checked in the process whether the comparison trajectory has a characteristic that likewise contains, as the type, a steering angle or a vehicle dynamics parameter. These two characteristics of the two trajectories are subsequently evaluated or assessed by way of the evaluation unit as to whether, as in this example, the steering angle or the vehicle dynamics parameter differ from one another only to a minor degree. For example, it can be checked whether the particular steering angle of the two trajectories with respect to a predefined tolerance value does not exceed a predefined threshold value, and thus is smaller than the predefined threshold value. In the event this is the case, the actual trajectory can be assigned or added to the trajectory class in which the comparison trajectory is contained. Consequently, trajectories that exhibit a certain level of agreement can advantageously be sorted or organized together by the particular trajectory class.

In another exemplary embodiment, at least one comparison trajectory of a trajectory class and at least one information-enhanced actual trajectory classified into this trajectory class may be merged, at least partially, so that a super trajectory is generated, which has greater informational content compared to the comparison trajectory and compared to the information-enhanced actual trajectory.

In some examples, at least one comparison trajectory or reference trajectory is present for each trajectory class.

In some examples, the merging may be carried out by way of the evaluation unit. The merging may involve blending or combining the data of or uniting trajectories. In this way, in particular an improved and more comprehensive trajectory can be generated. This takes place, for example, when it was possible to assign the at least one actual trajectory to a certain trajectory class. With a successful assignment of the actual trajectory, this actual trajectory can be merged or united with the comparison trajectory that was assigned to the actual trajectory. In this way, a new trajectory can be generated, serving as a "super trajectory," which has a greater informational content or a greater scope of information. As a result of the generated super trajectory, a comprehensive and improved, and in particular more efficient, trajectory can be generated or produced. The merging of the two trajectories may be partial (i.e., not a complete merge). It is likewise conceivable that the two trajectories are merged fully or completely with one another. In particular, a trajectory part or trajectory section of the comparison trajectory and a trajectory section or a trajectory part of the actual trajectory can be merged. In this way, the super trajectory can be generated based on individual trajectory sections of the respective trajectories.

In some examples, the merging of the two trajectories may take place in sections. For example, certain sections located within the trajectories can be merged. In the process, each of the two trajectories can be divided into trajectory sections in terms of the respective starting and end points. In this way, the respective trajectory sections can be merged with one another. A super trajectory can thus be produced or generated, which is information-enhanced compared to the actual trajectory, the comparison trajectory and the negotiated trajectory, and thus provides added value. In this way, this super trajectory can be used by the vehicle or by other vehicles of the vehicle fleet so as to be able to use this super trajectory in order to be able to carry out better driving operations.

In some examples, it is provided that, as a function of a vehicle-side detection system, by way of which information for generating the trajectory and/or for recognizing the surrounding area while driving the trajectory is detected and provided, a suitability value for use for a vehicle may be assigned to the trajectory, by an evaluation unit, and, as a function thereof, a necessity criterion for an information enhancement of the information-enhanced actual trajectory is determined. In this way, it can be decided or established whether and to what extend an information enhancement of the actual trajectory is necessary. Using the determined necessity criterion, it may be decided on the part of the system, for example, to what extent the information enhancement of the information-enhanced actual trajectory is to be carried out.

For example, a level and/or a degree and/or a type and/or a number of information enhancements or pieces of information enhancement information can be ascertained by way of the necessity criterion. Depending on what level of a necessity criterion was assigned to the actual trajectory, the need of an information enhancement can be ascertained.

For example, it may be the case that the actual trajectory has a low necessity criterion, and in particular the lowest necessity criterion. In this case, the actual trajectory may only be enhanced with little information, or even with no information at all. This may be the case for safety reasons so as to only carry out a plausibility check on or to confirm the trajectory. If, however, it is established that the actual trajectory has a high, and in particular the highest, necessity criterion, a wide variety of information can be assigned to the actual trajectory for information enhancement.

In particular, the trajectory can be evaluated or assessed by way of the evaluation unit to the effect that the suitability value and/or an accuracy value and/or a confidence value can be assigned to this trajectory. The trajectory can be classed as to whether the trajectory is sufficiently accurate and/or is sufficiently suitable and/or has a sufficient degree of confidence to be utilized by vehicles without information enhancement. For example, using the accuracy value, the trajectory can be evaluated as to whether geographical locating or a geographical position determination of the trajectory is possible. In the event it is established, for example, that the accuracy of the trajectory exceeds a tolerance value, an information enhancement of this trajectory must be carried out. It is possible to establish, for example, by a vehicle system that the trajectory, after a system-side evaluation, is not suitable for use by other vehicles. This may furthermore be checked again, for example, by the evaluation unit, and if the evaluation unit confirms this, an information enhancement of the actual trajectory can be carried out.

The vehicle-side detection system may be a surroundings sensor system or a sensor system or a front camera or another sensor system of the vehicle or of other vehicles of the vehicle fleet. In particular, the surrounding area can be detected, in particular continuously, by way of the vehicle-side detection system while the trajectory is being driven. Furthermore, the at least one location-specific characteristic and/or the at least one vehicle-specific characteristic can be at least temporarily detected by way of the vehicle-side detection system.

In another exemplary embodiment, it is provided that it may be determined, as a function of the necessity criterion, which at least one comparison trajectory is merged with the information-enhanced actual trajectory, so that the super trajectory has a higher suitability value than the comparison trajectory and the information-enhanced trajectory, each taken alone. Using the ascertained necessity criterion of the actual trajectory, it is possible to type or class or classify or categorize the actual trajectory with respect to the trajectory classes. In the process, weightings or prioritizations in terms of necessity criteria can be assigned to the respective trajectory classes. It is thus conceivable that it is possible to additionally decide, as a function of the necessity criterion, the class to which the actual trajectory is being assigned. The actual trajectory can thus be merged with the corresponding comparison trajectory of the selected trajectory class.

It is likewise conceivable that a comparison trajectory is determined independently of the trajectory classes based on the necessity criterion.

The necessity criterion may be used to establish what information and/or data of the actual trajectory is missing. In this way, a corresponding comparison trajectory can be selected, by way of which exactly this missing information and/or data and/or these missing characteristics can be provided. This is subsequently taken into consideration during the merging to form the super trajectory, so that the super trajectory has exactly these features of the actual trajectory which are still missing. The super trajectory thus has a higher suitability value or a higher accuracy value or a higher confidence value than the comparison trajectory, the information-enhanced actual trajectory and the negotiated trajectory. In this way, a super trajectory can be generated, which vehicles can utilize efficiently and in the best-possible manner, since the super trajectory has a high suitability value for use by vehicles.

In some examples, the actual trajectory may include information regarding a first detection system. In the comparison trajectory, it is possible, for example, to make information of a second detection system, which differs from the first detection system, available. In this case, the super trajectory would include information from two different detection systems. It is particularly advantageous when the two different detection systems providing the information of the super trajectory includes sic not only from two different detection systems, but also from different detection systems of two different vehicles. In this way, a wider range of diversity and different pieces of information can be blended.

In some examples, at least one comparison trajectory is merged with the information-enhanced actual trajectory, which includes position information, during the generation of the super trajectory when at least one location-specific characteristic of the vehicle is not detected, or cannot be detected, during the negotiation of the trajectory. In this way, it is possible to generate an information-enhanced, and potentially improved, super trajectory if an imprecise location of a position of the vehicle was ascertained. This may be the case, for example, when a malfunction and/or a failure of a global positioning system and/or of a global navigation satellite system occurs. This may also be the case, for example, when the vehicle drives the trajectory in a multi-level parking garage or in a tunnel or in a mountain region. In this case, no precise position determination of the vehicle can thus be carried out. If this is established by way of the evaluation unit, for example, at least one corresponding comparison trajectory or reference trajectory, which at least partially resembles the negotiated trajectory, can be used.

In the process, a comparison trajectory that provides position information may be used, which can be assigned to the presently driven trajectory by way of the evaluation unit, using specific algorithms or software tools. This position information is provided based on the vehicle of the vehicle fleet which negotiated the comparison trajectory. This can likewise be carried out by multiple vehicles, so that a mean value can be made available as the comparison trajectory. In this way, for example, the super trajectory can additionally include the pieces of information that were missing from the actual trajectory due to a lack of position determination. The super trajectory may thus be considered an improved trajectory compared to the negotiated trajectory.

Optionally, the super trajectory is the best trajectory at a certain point in time at which the trajectory is being driven. The super trajectory can be made available to other units and/or vehicles. For example, the super trajectory can be steadily augmented and updated in a continuous process.

In some examples a method is disclosed for operating a vehicle fleet or a vehicle fleet system including at least two vehicles, in which an enhanced information cluster, which describes at least one trajectory class including at least one trajectory to be driven by way of a vehicle, is generated by way of a method according to the preceding aspect or an advantageous refinement thereof, and in which at least one piece of information from an, in particular information-enhanced, trajectory class is made available to at least one vehicle of the vehicle fleet during a driving operation.

In some examples, a vehicle fleet composed of at least two or more vehicles can be managed here. For this purpose, a vehicle fleet system, and in particular an electronic vehicle fleet system, can be used, for example. Using technologies and techniques disclosed herein, an enhanced information cluster, by which a trajectory class can be enhanced, can be generated. The generation can be carried out by way of the electronic evaluation unit.

In some examples, the vehicles in the vehicle fleet can transmit the respective negotiated trajectories and/or the related specific characteristics to the evaluation unit and/or the vehicle fleet system via communication links, such as a mobile communication network, Bluetooth or WLAN.

In some examples, any vehicle of the vehicle fleet that would like to drive a present route section with the aid of a trajectory at least semi-autonomously or fully autonomously, can have corresponding information provided during a driving operation.

For example, a matching trajectory of a trajectory class that, in turn, corresponds to this trajectory can be transmitted as a function of the present position of the vehicle, so that an impending autonomous driving operation can be carried out, for example, based on this trajectory. It is likewise conceivable that a corresponding request is transmitted to the evaluation unit when a trajectory is presently driven by the vehicle, so that at least one piece or several pieces of information from an information-enhanced trajectory class, which correlates with the present position of the vehicle, can be made available to the vehicle. In this way, every vehicle of the vehicle fleet can make information regarding a trajectory available to a higher-level system, so that, in turn, other vehicles can retrieve information based on this saved information. The vehicle fleet can thus be operated more efficiently since all the vehicles are able to exchange and make information available among one another. As a result, in turn, each of the individual vehicles can be operated more efficiently, which, in turn, results in a more efficient vehicle fleet.

In one exemplary embodiment, it is provided that at least one super trajectory is provided to at least one vehicle of the vehicle fleet. For example, it is possible that the at least one vehicle of the vehicle fleet, depending on the present position thereof or the impending route thereof, will drive a route section or a trajectory section that was already driven by a previous vehicle. The previous vehicle can have provided a corresponding actual trajectory, which was merged to form the super trajectory, so that exactly this super trajectory can be used by the vehicle. In this way, the at least one vehicle can use the super trajectory, for example, for carrying out a semi-autonomous or fully autonomous driving operation, such as, for example, autonomous driving, or also autonomous parking. Each vehicle of the vehicle fleet can retrieve and use the improved super trajectory at any time. Consequently, each vehicle can be improved, based on the wide variety of information made available by the vehicles of the vehicle fleet, in that a presently needed trajectory can be replaced with the super trajectory, so that each vehicle can be operated more efficiently, and in particular more safely, since additional updated information for anticipatory driving exists.

In another exemplary embodiment, it is provided that a self-localization of the vehicle of the vehicle fleet, to which the super trajectory is transmitted, is carried out based on the super trajectory. This may be advantageous when the vehicle, based on a negotiated trajectory and/or based on the sensor system thereof and/or the vehicle system equipment level thereof, is not able to carry out a self-localization or can only carry out an imprecise self-localization. In this case, the super trajectory can remedy the situation since the super trajectory contains a wide variety of information regarding the trajectory, location information, or vehicle information, or position information, or much more. In this way, a self-localization of the vehicle can be carried out based on the information, and in particular the location-specific characteristics, contained in the super trajectory. This may also be advantageous since the present trajectory can be enhanced in this regard since the information of the super trajectory is additionally available. Consequently, the vehicle is able to carry out the self-localization based on the super trajectory, so that the vehicle can determine the present position thereof, in particular despite a failure of a global navigation satellite system. The super trajectory can furthermore be used to check whether the self-localization carried out by the vehicle itself is trustworthy or suitable.

In another exemplary embodiment, it is provided that the ascertained ego position, as a result of the self-localization that is carried out, is made available as additional information to the evaluation unit, so that this information, in turn, can be assigned to a particular trajectory class.

Some aspects of the present disclosure relate to an electronic trajectory generation system comprising at least one evaluation unit, which is designed to carry out a method according to any one of the preceding aspects or an advantageous refinement thereof.

In particular, it is possible, by way of the aforementioned electronic trajectory generation system, to carry out methods according to the present disclosure.

In some examples, the electronic trajectory generation system can be a central or decentralized system. The electronic trajectory generation system can be referred to as a back-end or as a data cloud or as a server device and/or a data processing system.

Optionally, the electronic trajectory generation system may comprise a communication unit by way of which the vehicles of the vehicle fleet can communicate with the electronic trajectory generation system. In this way, the most diverse pieces of information can be transmitted from the vehicle to the electronic trajectory generation system, and the electronic trajectory generation system, in turn, can transmit the corresponding information, such as the super trajectory, to the vehicles of the vehicle fleet. In particular, the vehicles of the vehicle fleet and, for example, a vehicle fleet system are connected, in terms of communication, to the electronic trajectory generation system.

Turning to FIG. 1, the figure illustrates a vehicle fleet 1, which includes at least two vehicles 2. In this exemplary embodiment, in particular three vehicles 2 of the vehicle fleet 1 are shown. The vehicle fleet 1 can include a plurality of vehicles 2. In particular, the vehicle fleet 1 can be referred to as a vehicle swarm, or as a rental car fleet, or as a company vehicle fleet, or as car sharing service fleet.

So as to allow the vehicle fleet 1 to be managed or operated efficiently and intelligently, a vehicle fleet system 3 can be provided. Using the vehicle fleet system 3, the vehicle fleet 1 can be managed or operated, for example. In this example, the vehicle fleet system 3 is configured as an electronic system. The vehicle fleet system 3 may be operated as a data cloud, or a back-end, or a server system, or a server device.

In some examples, each of the vehicles 2 of the vehicle fleet 1 may include a transceiver unit 4. Using this transceiver unit 4, the vehicles 2 of the vehicle fleet 1 can communicate with one another, and exchange or share data and/or information among one another. Likewise, it is possible to transmit information and/or data from the vehicles 2 to the vehicle fleet system 3 by way of the transceiver unit 4. Likewise, information and/or data can, in turn, be transmitted from the vehicle fleet system 3 to the vehicles 2, and in particular to the transceiver unit 4. In this way, a communication network is formed in an intelligent manner for the vehicle fleet 1. The vehicles 2 of the vehicle fleet 1 can, for example, be at least semi-autonomous, and in particular fully autonomous, vehicles. The vehicles 2 of the vehicle fleet 1 can thus be operated at least semi-autonomously and/or fully autonomously. In particular, the vehicles 2 of the vehicle fleet 1 can be referred to as highly automated vehicles.

The vehicles 2 may also include an electronic vehicle guidance system 5 for carrying out semi-autonomous or fully autonomous driving modes.

An electronic vehicle guidance system 5 may be understood to mean an electronic system configured to guide a vehicle fully automatically or fully autonomously, without necessitating a driver to intervene in a control process. The vehicle carries out all the necessary functions automatically, such as steering, braking and/or acceleration maneuvers, monitoring and detecting road traffic, as well as corresponding reactions. The electronic vehicle guidance system can implement a fully automatic or fully autonomous driving mode of the vehicle according to Level 5 of the classification according to SAE J3016. An electronic vehicle guidance system may also be understood to mean a driver assistance system, which supports a driver during semi-automated or semi-autonomous driving. In particular, the electronic vehicle guidance system can implement a semi-automated or semi-autonomous driving mode according to Levels 1 to 4 according to the SAE J3016 classification. In some examples, SAE J3016 may refer to the corresponding standard as amended in June 2018 for the purposes of illustration.

The at least semi-automatic vehicle guidance may thus include guiding the vehicle in accordance with a fully automatic or fully autonomous driving mode of Level 5 according to SE J3016. The at least semi-automatic vehicle guidance may also include guiding the vehicle in accordance with a semi-automatic or semi-autonomous driving mode according to Levels 1 to 4 according to SAE J3016.

For example, respective trajectories that were driven or are driven by the vehicles 2 of the vehicle fleet 1 can be made available to the vehicle fleet system 3 by the vehicles 2 of the vehicle fleet 1, and can thus be transmitted via communication channels. The vehicle fleet system 3 can thus, for example, save and manage, and possibly evaluate or analyze, the respective trajectories of the vehicles 2.

Due to the fact that each of the vehicles 2 of the vehicle fleet 1 contains different equipment, such as sensor systems, surroundings sensor systems, detection systems or other sensor systems, it is possible that at least some of the trajectories of vehicles 2 cannot be used or cannot be utilized by the vehicle fleet system 3. This may be the case, for example, when several of the vehicles 2 have an "inadequate" or "imprecise" sensor system, or even do not comprise certain sensors at all. So as to remedy this situation so that, in particular, all the trajectories of the vehicles 2 of the vehicle fleet 1 can be utilized and used, the method according to the invention is introduced. In particular, an electronic trajectory generation system 6 is provided for this purpose.

Using the electronic trajectory generation system 6, for example, trajectories of the vehicles 2 can be matched and synchronized. The electronic trajectory generation system 6 can be an electronic system composed of several individual components or individual systems. Likewise, the electronic trajectory generation system can be a separate, compact unit or system. In particular, the electronic trajectory generation system 6 may be an integral part of the vehicle fleet system 3. Likewise, the electronic trajectory generation system 6 may be integrated into the vehicle fleet system 3. Likewise, the electronic trajectory generation system 6 can be a system that differs from the vehicle fleet system 3, so that these are separate. In this case, the vehicle fleet system 3 and the electronic trajectory generation system 6 can have a permanent communication link to one another so that a wide variety of data can be exchanged.

The electronic trajectory generation system 6 may include an evaluation unit 7 for the respective evaluation of the wide variety of data, in particular the data of the vehicle fleet 1. The evaluation unit 7 may be an electronic evaluation unit or an electronic processing unit. In particular, the electronic trajectory generation system 6 can comprise a plurality of evaluation units. The evaluation unit 7 can either be integrated into the electronic trajectory generation system 6 or be designed separately therefrom. The electronic trajectory generation system 6 can comprise a communication system 31 so as be supplied with the data of the vehicle fleet 1. Using the communication system 31, the electronic trajectory generation system 6 can communicate with the vehicle fleet system 3, and in particular with the vehicle fleet 1.

Figure 2:
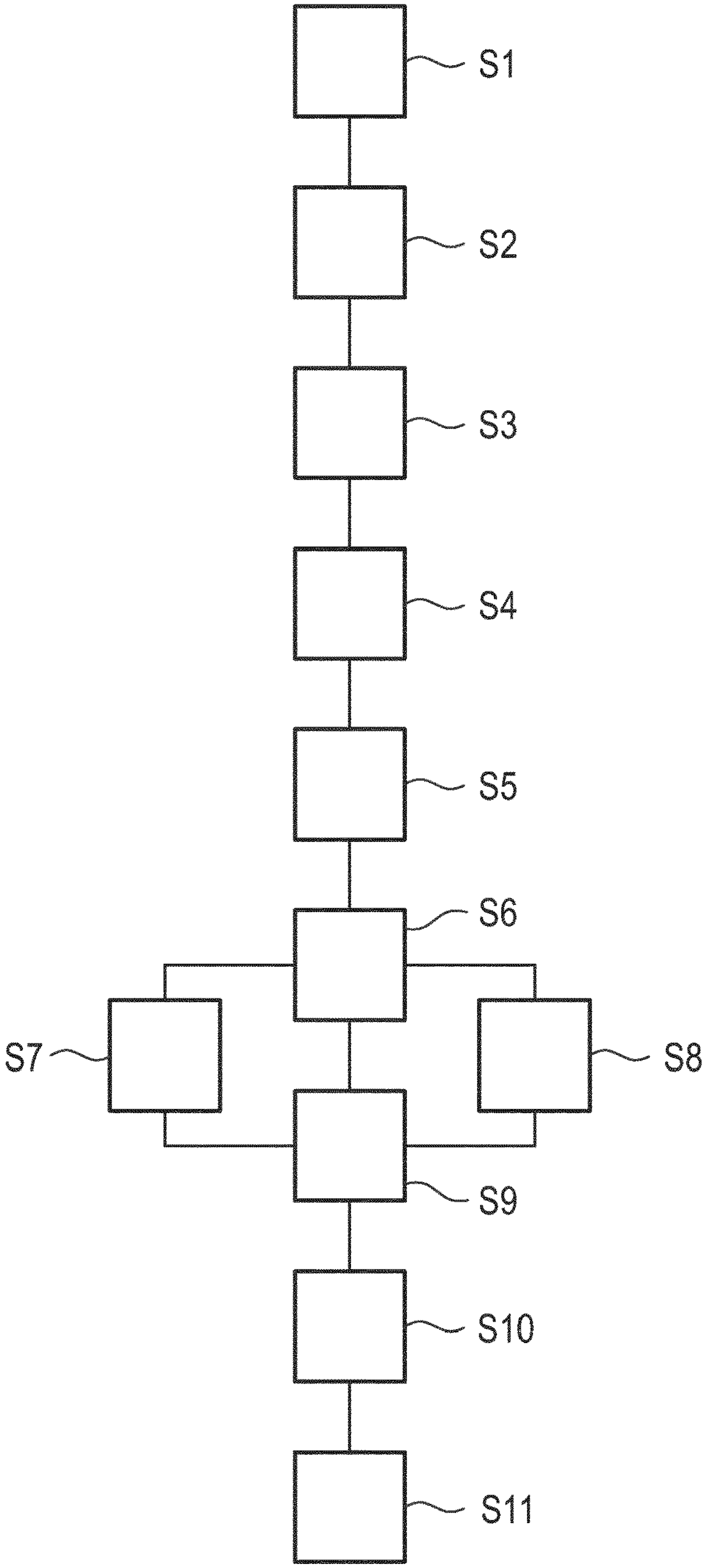
FIG. 2 illustrates an exemplary system sequence of a method according to the invention for enhancing an information cluster, according to some aspects of the present disclosure.

FIG. 2 describes an exemplary embodiment of a method according to some aspects of the present disclosure for enhancing an information cluster, which describes at least one trajectory class including at least one trajectory to be driven by a vehicle. Exemplary method steps and/or advantageous embodiments are described further below.

In particular, the trajectory of a vehicle 9 (see FIG. 1 and FIG. 3) while driving the trajectory 8 (see FIG. 3) is described by way of example. In particular, all the vehicles 2 of the vehicle fleet 1 can negotiate and record a trajectory.

Figure 3:
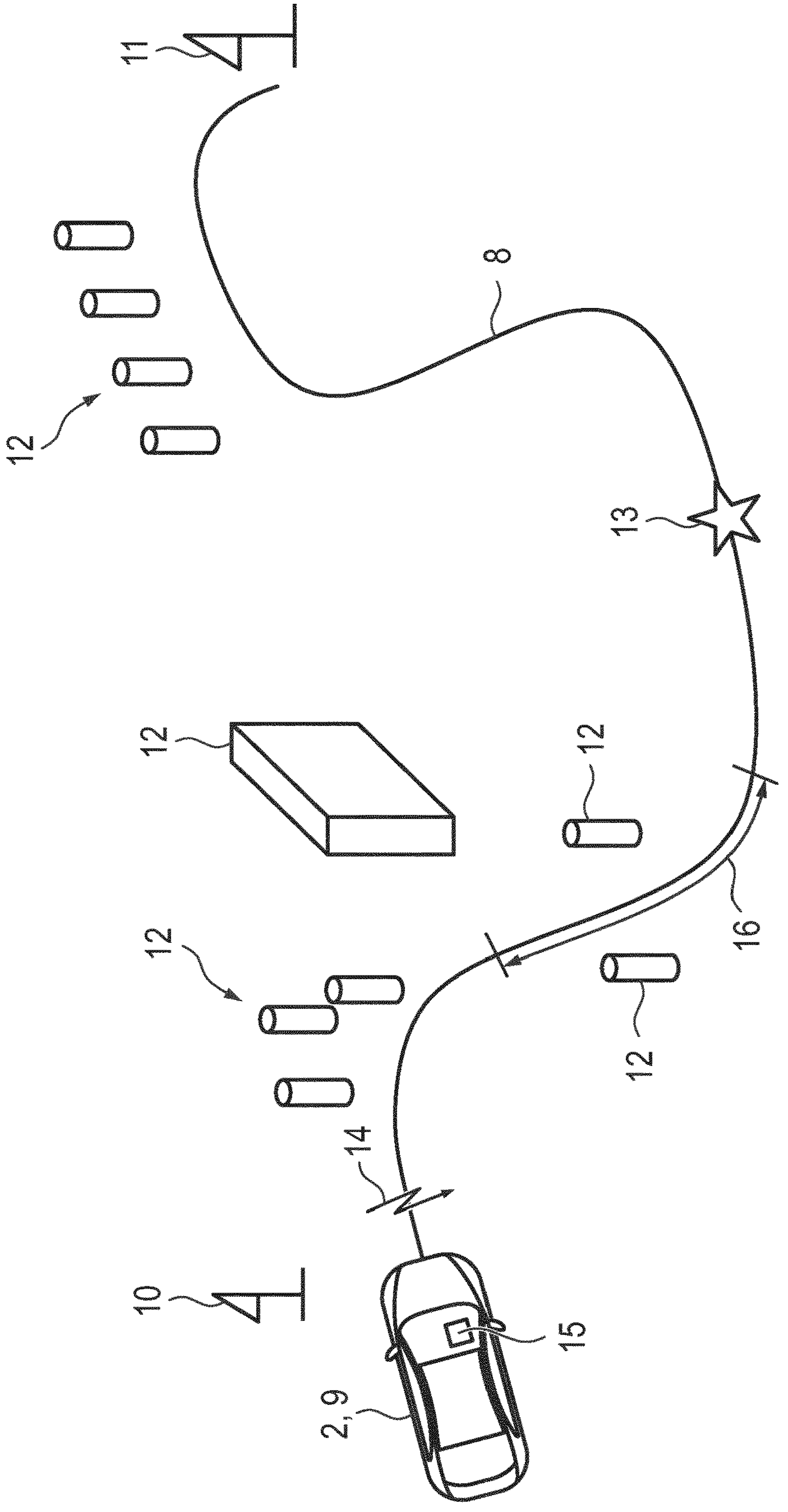
FIG. 3 illustrates an exemplary trajectory, which was negotiated by a vehicle of the vehicle fleet from FIG. 1, according to some aspects of the present disclosure.

In an exemplary first step S1, a trajectory 8 (see FIG. 3), which may be configured having reduced suitability, can be negotiated by way of a vehicle 9 of the vehicle fleet 1. The trajectory 8 may be a path or a way or a route traveled. In some examples, the trajectory 8 may be a route that was negotiated from a starting point 10 (see FIG. 3) to an end point 11 (see FIG. 3). The trajectory 8 can include several different route segments, such as expressway sections, curves, downhill grades, uphill grades, tunnel driving, or other driving situations. For example, the trajectory 8 can be negotiated along an expression section, or a rural road, or within a tunnel. It is likewise conceivable that the trajectory 8 is a trajectory with respect to a parking process, and in particular an autonomous parking process (see FIG. 3). In particular, the trajectory 8 can include a number of curves from the starting point 10 to the end point 11, as shown in FIG. 3. The trajectory 8 may have been negotiated in such a way that a wide variety of objects 12 (see FIG. 3) were circumnavigated or evaded. The objects 12 can, for example, be roadway boundaries, or trees, or, in a parking garage, parking garage structures such as pillars or boundaries.

In an optional second step S2, at least one location-specific characteristic 13 (see FIG. 3) of the vehicle 9 can be at least temporarily detected. In addition, or as an alternative, at least one vehicle-specific characteristic 14 (see FIG. 3) of the vehicle 9 can be at least temporarily detected. The location-specific characteristic 13 and/or the vehicle-specific characteristic 14 can be at least temporarily, and in particular continuously, detected while the trajectory 8 is being negotiated. In particular, several location-specific characteristics and/or several vehicle-specific characteristics can be detected when driving the trajectory 8.

In some examples, the at least one location-specific characteristic 13 and/or the at least one vehicle-specific characteristic 14 can be detected by way of a vehicle-side detection system 15 (see FIG. 3).

The vehicle-side detection system 15 may be a plurality of a wide variety of sensor systems of the vehicle 9. In particular, each of the vehicles 2 of the vehicle fleet 1 can comprise a vehicle-side detection system 15. For example, the vehicle-side detection system 15 can be a surroundings sensor system, such as a camera, an ultrasonic sensor system, a radar system, a LIDAR system, an image acquisition system, a front camera, or another vehicle detection system.

The surrounding area and/or the vehicle 9 can be detected by way of the vehicle-side detection system 15 during the negotiation of the trajectory 8. In particular, the surrounding area and/or the vehicle 9 can be continuously detected or recorded by way of the vehicle-side detection system 15, which may be referred to as an electronic system, during the negotiation of the trajectory.

The location-specific characteristic 13 and/or the vehicle-specific characteristic 14 may be partially detected or recorded during the negotiation of the trajectory 8. In particular, the characteristics 13, 14 can be detected in certain trajectory sections 16 (see FIG. 3). In particular, a certain number of characteristics 13, 14 can be detected in each case in arbitrary trajectory sections 16. In particular, the characteristics 13, 14 can be detected at arbitrary points in time and/or at arbitrary positions or sections between the starting point 10 and the end point 11 of the trajectory 8.

In an optional third step S3, the detected location-specific characteristic 13 and/or the detected location-specific characteristic sic 14 can be transmitted or provided to the evaluation unit 7. This can, for example, take place between a communication link between the communication system 8 and the transceiver unit 4. For example, the detected information with respect to the trajectory 8, and in particular the trajectory 8 itself, can be made available or transmitted to the evaluation unit 7 by way of the communication link 17 (see FIG. 1).

In an optional fourth step S4, an information-enhanced actual trajectory 18 (see FIG. 1) can be generated by way of the evaluation unit 7 by assigning or applying or adding the at least one location-specific characteristic 13 and/or the at least one vehicle-specific characteristic 14 to the negotiated trajectory 8. In other words, the characteristics 13, 14 and the trajectory 8 are blended or combined in terms of data. In addition to the actual information of the trajectory 8, the actual trajectory 18 thus also includes the additional information regarding the characteristics 13, 14. In addition or as an alternative, the data transmitted via the communication link 17 can initially be buffered or collected in a data memory 32, and in particular a digital memory unit (see FIG. 1). The data memory 32 can, for example, be an integral part of the vehicle fleet system 3.

So as to allow the generated actual trajectory 18, and thus the negotiated trajectory 8 of the vehicle 9, to be evaluated or assessed or analyzed, a piece of reference information or a reference trajectory can be provided. This reference can be used to evaluate the actual trajectory 18. For this purpose, a comparison trajectory 20 (see FIG. 4) can be made available, and thus be provided, by at least one vehicle 19 (see FIG. 4) of the vehicle fleet 1.

This comparison trajectory 20 may be negotiated by the at least one vehicle 19 of the vehicle fleet 2 and/or by several vehicles 2 of the vehicle fleet 1. This may take place either chronologically directly before the trajectory 8 is negotiated, or may already have been carried out in the past. This comparison trajectory 20 may be understood as a trajectory data set, or a trajectory set, or a trajectory accumulation. These may, for example, be buffered, or have been buffered, in the data memory 19. Using the evaluation unit 7, the information-enhanced actual trajectory 18 can thus be compared to the at least one comparison trajectory 19 or be assessed or be evaluated. In particular, a wide variety of comparison trajectories and/or other trajectories of a wide variety of vehicles 2 of the vehicle fleet 1 can be taken into consideration for the comparison of the actual trajectory 18. The wider the range of available comparison trajectories and/or reference trajectories, the more accurately and precisely can the comparison of the actual trajectory 18 be carried out. Similarly to the trajectory 8, the reference trajectory 20 is driven and recorded by the vehicle 19. For this purpose, the vehicle 19 can likewise comprise a detection system 15.

In another optional sixth step S6, the information-enhanced actual trajectory 18 may be assigned to one of at least two different, in particular predefined, trajectory classes 21 as a function of the comparison that is carried out, so that the at least one trajectory class 22, into which the information-enhanced actual trajectory 18 was able to be classified, can be enhanced with respect to the information cluster thereof. The actual trajectory 18 can thus be analyzed so as to establish the type of class or category or pattern to which this trajectory belongs. In other words, the actual trajectory 18 and of course, also all other trajectories are typed or grouped or classified into a respective associated trajectory class 22. In a respective trajectory class 22 of the several trajectory classes 21, a wide variety of trajectory types can be grouped or sorted among one another. In particular, the trajectory class 21 can be stored as a trajectory database in the vehicle fleet system 3. The information-enhanced actual trajectory 18 is, in particular, assigned so as to expand the use and/or expand the suitability of the trajectory 8. As a result of this assignment of the trajectory 8, this trajectory 8 can be synchronized with and/or matched to an associated trajectory class 22, so that enhanced, more comprehensive and/or augmented information is available for this trajectory 8.

Furthermore, it may be provided that the at least two trajectory classes 21 are distinguished with respect to a driving location and/or a driving theme and/or a vehicle speed while the vehicle 9 is driving and/or a roadway type. This distinction may take place automatically by the evaluation unit 7.

For example, a distinction may be made in the trajectory class 22 between an enclosed environment, such as a tunnel or a parking garage, and a non-enclosed environment, such as an expressway and/or a rural road.

In another trajectory class 23, a driving theme, such as parking or maneuvering, may be distinguished compared to driving freely. In particular, it is possible to type a trajectory with respect to enclosed driving into one trajectory class, and non-enclosed driving may be typed into a trajectory class different therefrom, and only trajectories for parking or maneuvering may be typed into another trajectory class, and driving on an expressway or a rural road may be typed into still another trajectory class. These shall, in particular, not be construed to be exhaustive. These examples only provide a small overview of the many different types and forms into which trajectories can be divided into respective trajectory classes 21. Trajectory classes can be formed in each case for a wide variety of driving situations and/or driving tasks and/or driving processes and/or driving locations. In this way, a wide variety of trajectories, and in particular the trajectory 8, can be grouped or selected or typed into a wide variety of trajectory classes 21.

Furthermore, it may be provided that the actual trajectory 18 is evaluated or analyzed or assessed, by way of the evaluation unit 7, at least based on the respective type of the characteristics 13, 14 and/or based on at least the number of the characteristics 13, 14 and/or based on the trajectory 8 itself, as to the trajectory class 21 with which an association and/or agreement was found. In this way, the characteristics 13, 14 added to the actual trajectory 18 can be regarded as specific features, based on which the actual trajectory can be assigned to an associated trajectory class 21. In other words, the characteristics 13, 14 can likewise be taken into consideration during the typing of the trajectory classes 21.

In an optional step 7, at least the type and/or the number of characteristics 13, 14 of the actual trajectory 18 can be compared to the type and/or number of characteristics 24, 25 (see FIG. 4) of the at least one comparison trajectory 20. The comparison trajectory 20 can, as is shown by way of example in FIG. 4, include two different location-specific characteristics 24 and two different vehicle-specific characteristics 25. For example, the location-specific characteristics 24 can be a curve, a road condition, or a road type. The vehicle-specific characteristics 25 can be, for example, a steering angle, an acceleration process, a braking process, or a vehicle state.

Figure 4:
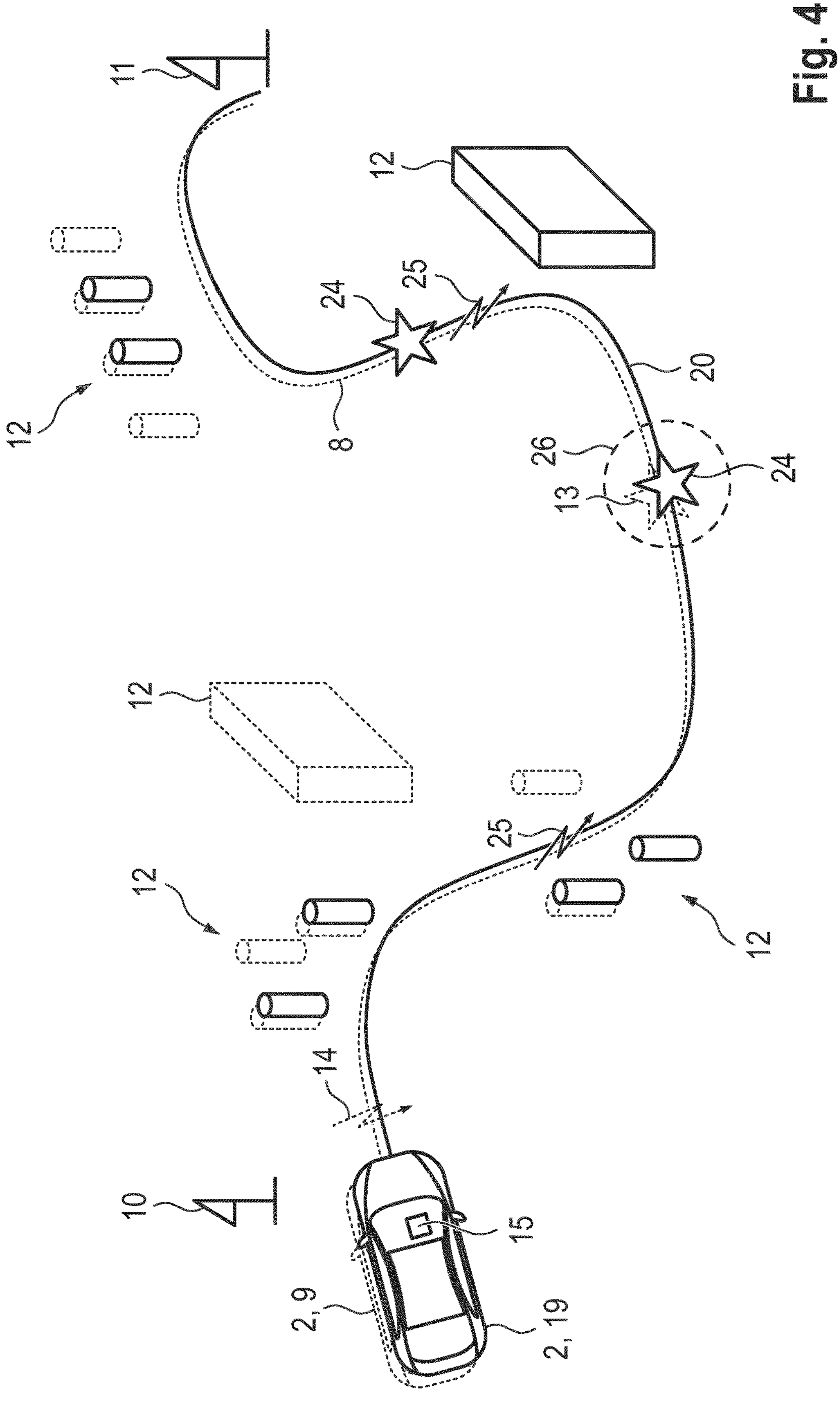
FIG. 4 illustrates an exemplary comparison trajectory, which was negotiated by a further vehicle of the vehicle fleet from FIG. 1, according to some aspects of the present disclosure.

As is shown in FIG. 4, the trajectory 8 differs from the comparison trajectory 20 in that the comparison trajectory 20 in each case has an additional characteristic 24, 25. The comparison trajectory 20 thus provides more information, and thus added value, than the trajectory 8. If it is now established by way of the evaluation unit 7 that the two trajectories 18, 20 differ in at least a type and/or a number, the actual trajectory 18 can be assigned to or classified into the trajectory class 21 into which the comparison trajectory 20 was classified. This has the advantage that the trajectories that essentially agree with one another are blended in one trajectory class, and the comparison trajectory 20 provides added value compared to the actual trajectory 18.

In another additional or optional step S8, which can be carried out after step S7 alone, or in addition to step S7, it may be provided that at least one type of a characteristic 13, 14 of the information-enhanced actual trajectory 18 is compared to at least an identical type of a characteristic 24, 25 of the comparison trajectory 20, and, at least when the compared types deviate by a tolerance value smaller than a threshold value, the actual trajectory 18 is classified at least into the trajectory class 21 in which the comparison trajectory 20 is contained. This is shown, for example, in FIG. 4 in the area 26 in which the characteristic 13 of the actual trajectory 18 and the characteristic 24 of the comparison trajectory 20 are substantially identical. This essentially means that the two characteristics 13, 14 only differ or deviate from one another by a tolerance value smaller than a threshold value.

In an optional further step S9, it may be provided that the trajectory 8, as a function of the vehicle-side detection system 15 by way of which information for generating the trajectory 8 and/or for recognizing the surrounding area while the trajectory 8 is being driven, is assigned a suitability value and/or an accuracy value and/or a confidence value for use for a vehicle 2 of the vehicle fleet 1, in particular by the evaluation unit 7. This would be the case, for example, when it is established by the vehicle fleet system 3 or by an electronic vehicle guidance system 5 of the vehicles 2 that the trajectory 8 could be incorrect and/or imprecise. In this case, for example, a necessity criterion can be generated or determined for the actual trajectory 18 by the evaluation unit 7. Using the necessity criterion, the actual trajectory 18 can be evaluated or assessed with respect to the suitability thereof and/or the confidence value thereof and/or the accuracy thereof. In this way, it can be established, for example when the necessity criterion is low, that the actual trajectory 18 can already be classified as a "good" trajectory. In the event that the necessity criterion is very high, it may be inferred that the trajectory 8 is a "poor" trajectory. In this case, it is advantageous to enhance the information of the actual trajectory 18. In an optional tenth step S10, the trajectory 8, and in particular the actual trajectory 18, can be improved or enhanced by at least partially merging or blending the actual trajectory 18 with the comparison trajectory 20, which is in the same trajectory class 22 as the actual trajectory 18. In this way, the information regarding the actual trajectory 18 and the comparison trajectory 20 is blended or merged so as to generate a super trajectory 27 that is improved compared to these two trajectories 18, 20. This is carried out by the evaluation unit 7. This super trajectory 27 and/or improved trajectory 27 (see FIG. 1) is improved in relation to the actual trajectory 18 and the comparison trajectory 20 so as to have greater informational content. The super trajectory 27 thus provides added value compared to the trajectories 18, 20.

For example, it is possible to determine, as a function of the necessity criterion, which at least one comparison trajectory 20 is to be merged with the actual trajectory 18 so that the super trajectory 27 has a higher suitability value and/or accuracy value and/or confidence value than the trajectories 18, 20. In the event it was established, by way of the necessity criterion, that the actual trajectory 18 is very imprecise, and in particular not usable for the vehicles 2 of the vehicle fleet 1, this actual trajectory can be merged with a comparison trajectory 20 that best, and in particular most, upgrades or improves the actual trajectory 18. In this way, it can be achieved that the super trajectory 27 has considerable added value, and in particular a considerably higher informational content than the trajectories 18, 20. This super trajectory 27 can thus also be used in a diverse and comprehensive manner by the vehicles 2 of the vehicle fleet 1.

In some examples, a type of the detection system 15 can be taken into consideration during the merging. It is possible, for example, that the actual trajectory 18 was detected by way of a first detection system, such as a radar system, for example. The comparison trajectory 20 may have been detected by way of a LIDAR system. The combination or the merged super trajectory 27 would thus contain two different sensor systems, in terms of the informational content, whereby improved redundancy and more information could be made available. The super trajectory 27 thus contains more, and more comprehensive, information.

It may furthermore be provided that at least one comparison trajectory 20 is merged with the actual trajectory 18, which includes position information of the vehicle 9 of the vehicle fleet 1 which negotiated the comparison trajectory 20, during the generation of the super trajectory 27 when at least one location-specific characteristic 13 of the vehicle 9 was not detected, or could not be detected, during the negotiation of the trajectory 8. In this way, it is possible that the vehicle 9 did not have any GPS position available as position information. So as to provide the trajectory 8 with a GPS position, and thus be able to precisely locate the trajectory 8, a comparison trajectory 20 which includes position information, that is, a global navigation satellite system position, is used. The trajectory 8 can thus be provided with added value by merging the actual trajectory 18 with such a comparison trajectory 20.

In another or optional eleventh step S11, the vehicle fleet 1 can be intelligently operated by way of a method, and in particular by way of the vehicle fleet system 3, in an intelligent manner by using the provided information and/or data and/or embodiments of steps S1 to S10. In particular, as described above, all the information regarding the trajectories can be made available to all the vehicles 2 of the vehicle fleet 1, and likewise all the data of the vehicles 2 can, in turn, be made available for the enhancing the information of trajectories. In particular, in step S11, the previously generated super trajectory 27 can be made available, and in particular transmitted, to the actual vehicle 9, and likewise to all the vehicles 2 of the vehicle fleet 1. In this way, the further vehicles 2 can use the super trajectory 27 for a wide variety of driving tasks and/or driving systems and/or driving operations. In particular, the super trajectory 27, which has a location reference, can be used so that the at least one vehicle 9 or other vehicles 2 of the vehicle fleet 1 can carry out a self-localization.

For example, it may furthermore be provided that at least one piece of class information regarding the trajectory class 21, into which the actual trajectory 18 was classified, is transmitted to the vehicle 9 and/or to the vehicles 2 of the vehicle fleet 1.

Hereafter, embodiments with respect to FIG. 1 will be described again.

In one exemplary embodiment, it may furthermore be provided that the actual trajectory 18 assigned to a trajectory class 21 is merged or blended or united with at least one trajectory that is saved or stored in the same, identical or like trajectory class 21, whereby an improved overall trajectory can be produced or generated as the super trajectory 27, which contains at least one additional location-specific characteristic 13, 24 and/or an additional vehicle-specific characteristic 14, 25 and/or an additional piece of position information and/or an additional piece of trajectory information compared to the actual trajectory 18.

It may be provided in another exemplary embodiment that a piece of position information, such as, for example, a GPS position, related to at least one location along the driven trajectory 8 is generated as a function of the comparison, wherein this piece of position information is provided to a vehicle system of the vehicle 9 or another vehicle 2 of the vehicle fleet 1, and wherein a self-localization of the vehicle 9 can be carried out and/or checked using the piece of position information.

In some examples, it is provided that the starting point 10 and/or the end point 11 of the negotiated trajectory 8 and/or at least one intermediate point along the driven trajectory 8 and/or at least one relocalization point of the negotiated trajectory 8 can be determined or ascertained and/or checked as a function of the piece of position information. In particular, the starting point 10 and/or the end point 11 of the negotiated trajectory 8 and/or the at least one intermediate point along the driven trajectory 8 and/or the at least one relocalization point of the negotiated trajectory 8 can be assigned as additional information to the information-enhanced actual trajectory 18. In one exemplary embodiment, it is provided that a present location of the vehicle 9 can be ascertained as a function of the piece of position information, wherein the trajectory class 21 is checked by way of the evaluation unit 7 as to whether a starting point of a potential trajectory of the trajectory class agrees or correlates with the present location of the vehicle 9, wherein this potential trajectory is provided at least to the electronic vehicle guidance system 5 if agreement exists.

In some examples, it is furthermore provided that a semi-autonomous, in particular fully autonomous, in particular automatic, locomotion process or parking process of the vehicle can be carried out by means of the electronic vehicle guidance system 5, as a function of the potential trajectory. This can be carried out by the vehicle 9 and by any arbitrary vehicle 2 of the vehicle fleet 1.

In some examples, it may be provided that a wide variety of information can also be used to recognize the starting point or the relocalization point. The starting and relocalization points above all exist in parking garages. These points can be both existing landmarks and other localization points detectable by the vehicle 2, 9. For example, in a parking garage, it may be that the density or distribution of the relocalization points is not sufficient. If needed, additional markings can be provided in the surrounding area of the parking garage, for example via a pattern. When the vehicle 9 during an automatic parking process while driving through, or the vehicle fleet system 3 within the scope of a post-processing operation, recognizes that an insufficient number of landmarks are present in an area, this can be automatically transmitted to the evaluation unit 7, so that additional information can be made available based on the trajectory classes 21.

In some examples, it may be provided that the triggering for recognizing starting and/or relocalization points can take place by GPS information or navigation maps if it is recognized, for example, that a driver may soon enter an area with trajectory data and/or trained trajectories. This is particularly advantageous during an automated process for entering or exiting a parking space.

In particular, the trajectory 8 can encompass either a trajectory recorded by the vehicle 9 or a trajectory of other vehicles as well as trajectory segments.

In some examples, the information-enhanced trajectory class 21 can be used to be able to verify or check the trajectory 8 or a trajectory of a vehicle 2. In this way, a vehicle 2 in a parking garage can be prevented from erroneously using a trajectory for the third parking level, even though the vehicle 2 is located on the first parking level of the parking garage. In this way, a comparison of the impending trajectory of the vehicle 2 can be carried out by way of the information of the trajectory class. For this purpose, a sufficiently large number of data can be added to a trajectory based on the characteristics 13, 14 so as to be able to unambiguously assign this trajectory to a trajectory class 21. This can also, for example, be carried out continuously beforehand during the use of the present trajectory of the vehicle 2. In this way, complex external systems can be dispensed with, and no complex and/or imprecise or error-prone indoor localization and no infrastructure change or infrastructure preparation are necessary.

However, additional assistance can be taken into consideration by way of the following information:

- position information from existing systems, such as, for example, a rough localization via GPS and/or via the aggregation of movement information by means of the steering angle and wheel impulses and/or vehicle speeds;
- saving the last known vehicle position when the vehicle is shut off or the driving operation is deactivated; using the last saved position from the history upon reactivation;
- detecting and counting an assignment to a level in a parking garage, for example via barometer, rotations of the spindle counters, or ramps driven;
- communicating with and/or notifying other vehicles and/or infrastructures for further plausibility analysis.

In some examples, the following steps can be carried out:

- recording the described vehicle data, vehicle-specific characteristic 14, synchronously with location-specific characteristics 14 or existing location data;
- optionally prefiltering or reducing the data load or verifying the information;
- transmitting to the evaluation unit 7;
- processing by way of the evaluation unit 7 using known methods synchronously with the trajectory data;
- delivering processed preliminary results in the form of computed trajectories or additional information, such as surroundings data or location reference, back to the original vehicle 9 or to further vehicles 2 that intend to use the function of trained parking. A vehicle 2 would thus be in a position to check whether a transmitted trajectory in fact matches the present location of the vehicle. The location reference can relate both to absolute coordinates and to local preferences, such as parking garages having no GPS reception.
- self-localizing by the vehicle 9 based on the data, received from the back-end, at the starting point 10 of a generated redrive trajectory, or relative thereto, in a parking garage by way of the previously transmitted data; and
- utilizing the newly obtained localization for assistance functions, such as parking assistance functions.

A trajectory training trip can be triggered, for example, by a driver of the vehicle 9 or by a vehicle system of the vehicle 9. Thereafter, a comparison is carried out by way of the evaluation unit 7. In the process, data can be uploaded via the communication link 17. Thereafter, the vehicle 9 itself can retrieve or poll corresponding data or information from the vehicle fleet system 3 via a communication link 28, for example. Thereafter, a synchronization and matching via corresponding features, serving as characteristics 13, 14, can be carried out in the vehicle 9 itself or in an evaluation unit of the electronic trajectory generation system 6.

Thereafter, in turn, the data can be merged, in particular the actual trajectory 18 with the comparison trajectory 20. This super trajectory 27, which is provided as the merge result, can, in turn, be used for trained parking, for example, or for another trained driving operation.

Furthermore, it may be possible to establish internally by a vehicle 2 of the vehicle fleet 1 whether the last trip of the vehicle 2 up to a parking process is suitable as a training trip for trained parking. In the event this is not the case, the vehicle 2 can place a corresponding request to the vehicle fleet system 3. Corresponding usable data, which is made available by the information-enhanced trajectory class 21, or trajectories can be transmitted to the vehicle 2 via a communication link 29, so that, for example, trained parking can be carried out, without the vehicle 2 itself having carried out a training process, since the data is already available in processed form in the trajectory classes 21. For this purpose, the super trajectory 27 may be used.

In some examples, it may be provided that the vehicle 9 is located in a parking garage and attempting to retrieve a trajectory 8 for an automated parking process. There may be no global navigation satellite system (GNSS) reception, so that initially a route or a portion traveled in the parking garage, up to the ego position of the vehicle 9, is sent as a traveled trajectory, plus the corresponding characteristics 13, 14, to the evaluation unit 7 so as to obtain an exact position. The evaluation unit 7 blends the sent data and finds suitable trajectories based on the trajectory classes 21, and synchronizes the trajectory 8 traveled by the vehicle 9 with the data of the trajectory class 21, and can thus compute the ego position, that is, the present position, of the vehicle. The exact position can be used to use further functions with respect to assisted driving functions, such as trajectories for parking.

In some examples, it may be provided that the vehicle 9 is located in a tunnel and thus wants to drive autonomously, without an exact GNSS position. The trajectories traveled since the tunnel was entered, plus the characteristics 13, 14, can be sent to the evaluation unit 7 so as to obtain an exact position based on the trajectory class 21. The evaluation unit 7 matches the sent data and finds a suitable trajectory based on the trajectory classes 21, and synchronizes the trajectory traveled by the vehicle with the data and can thus compute the ego position of the vehicle, that is, the present position of the vehicle 9. The exact position can, in turn, be used for trajectories for autonomous driving in a tunnel.

For example, the trajectory 8 can be a trajectory that was driven manually, automatically or after having been trained, and a trained trajectory.

The information-enhanced trajectory class 21 may also provide added value for vehicles that are "very well-equipped" in cases of high GNSS systems in the vehicle 9 or high GNSS shadowing. Otherwise, the vehicles 2 equipped in this way serve as data suppliers by supplying location-based validated trajectories and data for the vehicle fleet system 3.

For example, the vehicle 9 can comprise a GNSS system having a confidence range which, depending on the satellite shadowing situation, can be several 100 meters. Moreover, these systems must have a minimum number of satellites to be able to ascertain a particular position. In the event that this GNSS system in the vehicle 9 establishes that the accuracy for a use case is imprecise, the situation may be remedied based on the information-enhanced trajectory class 21.

In some examples, the particular information regarding the trajectory 8 can be continuously transmitted to the evaluation unit 7. In this way, better support of the localization and navigation can be provided. Furthermore, it is possible that it is decided by the vehicle 9 itself when the corresponding trajectory 8 and the associated data are transmitted to the evaluation unit 7. This is in particular of advantage for reducing a data load. For example, a trigger for this may be when the vehicle 9 is not certain whether the quality of the present localization is still sufficiently high.

Permanent data transmission may be needed during the generation of a suitable data base in a new territory in which a vehicle of the vehicle fleet 2 is located for the first time, in order to make an exact data collection available.

For example, the generated information-enhanced trajectory classes and the merging are carried out by means of known methods from big data processing. Similar or identical features of objects or images of the trajectories can be taken into consideration in the process. In particular, data logs of a data channel can be compared by means of 1D images for detecting the characteristics 13, 14.

For example, the trajectory 8 may be a trajectory that has no location reference, or only an imprecise location reference. Using the information-enhanced trajectory class 21, it is thus possible to carry out a plausibility check and/or reconstruct the trajectory 8.

In particular, the actual trajectory 18 and the comparison trajectory 20 are superimposed, for example, during merging. In particular, the trajectories of the vehicle fleet 1 can be made available to the vehicle fleet system 3 as swarm trajectories.

In particular, the evaluation unit 7 can, for example, implement a respective mean value with respect to identical trajectories in the particular trajectory classes 21, so that improved information regarding a trajectory can already be made available here. In particular, data can be correlated in the respective trajectory classes.

For example, the vehicles 2 of the vehicle fleet 1 can accordingly comprise a respective circular buffer so that, for example, the last 50 or 100 or 1000 meters of the traveled route can be retroactively saved as a trajectory, and be retrieved again.

The vehicle fleet system 3 can furthermore comprise an electronically readable data carrier 30. The electronically readable data carrier 30 can include saved, electronically readable situations, which encompass at least one computer program product and are configured in such a way that a method according to the invention can be carried out when the data carrier 30 is used in the vehicle fleet system 3.

LIST OF REFERENCE SIGNS

1 vehicle fleet
2 vehicles of the vehicle fleet
3 vehicle fleet system
4 transceiver unit
5 electronic vehicle guidance system
6 electronic trajectory generation system
7 evaluation unit
8 trajectory
9 vehicle
10 starting point
11 end point
12 objects
13 location-specific characteristic
14 vehicle-specific characteristic
15 detection system
16 trajectory section
17 communication link

18 actual trajectory
19 vehicle
20 comparison trajectory
21 trajectory classes
22, 23 trajectory class
24 location-specific characteristic of the comparison trajectory
25 vehicle-specific characteristic of the comparison trajectory
26 area
27 super trajectory
28, 29 communication links
30 electronically readable data carrier
31 communication system
32 data memory
S1 to S11 first to eleventh steps

The invention claimed is:

1. A method for enhancing an information cluster, characterizing at least one trajectory class comprising at least one trajectory to be driven by a vehicle, comprising:
receiving trajectory data for at least one trajectory negotiated by at least one vehicle;
detecting (i) at least one location-specific characteristic of the vehicle and/or (ii) at least one vehicle-specific characteristic of the vehicle from the received trajectory data;
generating an information-enhanced actual trajectory, comprising (i) the at least one location-specific characteristic of the vehicle and/or (ii) the at least one vehicle-specific characteristic of the vehicle being assigned to the negotiated trajectory;
comparing the information-enhanced actual trajectory to at least one comparison trajectory in an evaluation unit, the at least one comparison trajectory being received from at least one fleet vehicle of a vehicle fleet that differs from the vehicle;
assigning the information-enhanced actual trajectory to one of at least two different trajectory classes depending on the comparison, so that the at least one trajectory class into which the information-enhanced actual trajectory is classified is enhanced with respect to the information cluster thereof; and
providing, during a driving operation of a target vehicle of the vehicle fleet, at least one piece of information from the trajectory class to an electronic vehicle guidance system of the target vehicle, wherein the at least one piece of information comprises input data for at least semi-autonomous vehicle guidance or the self-localization of the target vehicle.

2. The method according to claim 1, wherein the at least two trajectory classes are associated with at least one of a driving location, a driving theme, a vehicle speed while the vehicle is driving, and/or a roadway type.

3. The method according to claim 2, wherein comparing the information-enhanced actual trajectory comprises comparing at least one of (i) a number and/or type of at least one location-specific characteristic of the vehicle and/or vehicle-specific characteristic and/or (ii) the trajectory to the trajectory class with which an association is found.

4. The method according to claim 3, further comprising
comparing the number and/or type of the information-enhanced actual trajectory to the number and/or type of characteristics of the at least one comparison trajectory of a trajectory class; and
classifying the information-enhanced actual trajectory into the trajectory class if the number and/or type differ.

5. The method according to claim 1, further comprising
comparing at least one type of a characteristic of the information-enhanced actual trajectory to at least an identical type of a characteristic of the comparison trajectory; and
classifying the information-enhanced actual trajectory into the trajectory class in which the comparison trajectory contained if the compared types deviate by a tolerance value smaller than a threshold value.

6. The method according to claim 1, further comprising at least partially merging (i) at least one comparison trajectory of a trajectory class and (ii) at least one information-enhanced actual trajectory classified in the trajectory class, to generate a super trajectory comprising greater informational content compared to the comparison trajectory and the information-enhanced actual trajectory.

7. The method according to claim 6, further comprising determining, as a function of the necessity criterion, which at least one comparison trajectory is merged with the information-enhanced actual trajectory, so that the super trajectory comprises a higher suitability value than the comparison trajectory and the information-enhanced trajectory.

8. The method according to claim 6, further comprising merging at least one comparison trajectory with the information-enhanced actual trajectory comprising position information, during the generation of the super trajectory when at least one location-specific characteristic of the vehicle is not detected during the negotiation of the trajectory.

9. The method according to claim 1, further comprising
assigning a suitability value for use for a vehicle to the trajectory via the evaluation unit, wherein the suitability value is configured as a function of a vehicle-side detection system in which information for generating the trajectory and/or for recognizing the surrounding area while driving the trajectory is detected and provided; and
determining a necessity criterion for an information enhancement of the information-enhanced actual trajectory based on the suitability value.

10. An electronic trajectory generation system for enhancing an information cluster, characterizing at least one trajectory class comprising at least one trajectory to be driven by a vehicle, comprising:
a memory apparatus; and
an evaluation unit, operatively coupled to the memory apparatus, the evaluation unit being configured to
receive trajectory data for at least one trajectory negotiated by at least one vehicle;
detect (i) at least one location-specific characteristic of the vehicle and/or (ii) at least one vehicle-specific characteristic of the vehicle from the received trajectory data;
generate an information-enhanced actual trajectory, comprising (i) the at least one location-specific characteristic of the vehicle and/or (ii) the at least one vehicle-specific characteristic of the vehicle being assigned to the negotiated trajectory;
compare the information-enhanced actual trajectory to at least one comparison trajectory in the evaluation unit, the at least one comparison trajectory being received from at least one fleet vehicle of a vehicle fleet that differs from the vehicle;
assign the information-enhanced actual trajectory to one of at least two different trajectory classes depending on the comparison, so that the at least one trajectory class into which the information-enhanced actual trajectory is classified is enhanced with respect to the information cluster thereof; and provide, via the communication system and during a driving operation of a target vehicle of the vehicle fleet, at least one piece of information from the trajectory class to an electronic vehicle guidance system of the target vehicle, wherein the at least one piece of information comprises input data for at least semi-autonomous vehicle guidance or self-localization of the target vehicle.

11. The electronic trajectory generation system according to claim 10, wherein the at least two trajectory classes are associated with at least one of a driving location, a driving theme, a vehicle speed while the vehicle is driving, and/or a roadway type.

12. The electronic trajectory generation system according to claim 11, wherein the evaluation unit is configured to compare the information-enhanced actual trajectory by comparing at least one of (i) a number and/or type of at least one location-specific characteristic of the vehicle and/or vehicle-specific characteristic and/or (ii) the trajectory to the trajectory class with which an association is found.

13. The electronic trajectory generation system according to claim 12, wherein the evaluation unit is configured to compare the number and/or type of the information-enhanced actual trajectory to the number and/or type of characteristics of the at least one comparison trajectory of a trajectory class; and classify the information-enhanced actual trajectory into the trajectory class if the number and/or type differ.

14. The electronic trajectory generation system according to claim 10, wherein the evaluation unit is configured to compare at least one type of a characteristic of the information-enhanced actual trajectory to at least an identical type of a characteristic of the comparison trajectory; and classify the information-enhanced actual trajectory into the trajectory class in which the comparison trajectory contained if the compared types deviate by a tolerance value smaller than a threshold value.

15. The electronic trajectory generation system according to claim 10, wherein the evaluation unit is configured to at least partially merge (i) at least one comparison trajectory of a trajectory class and (ii) at least one information-enhanced actual trajectory classified in the trajectory class, to generate a super trajectory comprising greater informational content compared to the comparison trajectory and the information-enhanced actual trajectory.

16. The electronic trajectory generation system according to claim 15, wherein the evaluation unit is configured to determine, as a function of the necessity criterion, which at least one comparison trajectory is merged with the information-enhanced actual trajectory, so that the super trajectory comprises a higher suitability value than the comparison trajectory and the information-enhanced trajectory.

17. The electronic trajectory generation system according to claim 15, wherein the evaluation unit is configured to merge at least one comparison trajectory with the information-enhanced actual trajectory comprising position in-formation, during the generation of the super trajectory when at least one location-specific characteristic of the vehicle is not detected during the negotiation of the trajectory.

18. The electronic trajectory generation system according to claim 10, wherein the evaluation unit is configured to assign a suitability value for use for a vehicle to the trajectory via the evaluation unit, wherein the suitability value is configured as a function of a vehicle-side detection system in which information for generating the trajectory and/or for recognizing the surrounding area while driving the trajectory is detected and provided; and determine a necessity criterion for an information enhancement of the information-enhanced actual trajectory based on the suitability value.

19. A non-transitory computer-readable medium having stored therein instructions executable by one or more processors for enhancing an information cluster, characterizing at least one trajectory class comprising at least one trajectory to be driven by a vehicle, the instructions being configured to:

receive trajectory data for at least one trajectory negotiated by at least one vehicle;

detect (i) at least one location-specific characteristic of the vehicle and/or (ii) at least one vehicle-specific characteristic of the vehicle from the received trajectory data;

generate an information-enhanced actual trajectory, comprising (i) the at least one location-specific characteristic of the vehicle and/or (ii) the at least one vehicle-specific characteristic of the vehicle being assigned to the negotiated trajectory;

compare the information-enhanced actual trajectory to at least one comparison trajectory in an evaluation unit, the at least one comparison trajectory being received from at least one fleet vehicle of a vehicle fleet that differs from the vehicle;

assign the information-enhanced actual trajectory to one of at least two different trajectory classes depending on the comparison, so that the at least one trajectory class into which the information-enhanced actual trajectory is classified is enhanced with respect to the information cluster thereof; and cause, during a driving operation of a target vehicle of the vehicle fleet, at least one piece of information from the trajectory class to be provided to an electronic vehicle guidance system of the target vehicle, wherein the at least one piece of information comprises input data for at least semi-autonomous vehicle guidance or self-localization of the target vehicle.

20. The non-transitory computer-readable medium according to claim 19, wherein the at least two trajectory classes are associated with at least one of a driving location, a driving theme, a vehicle speed while the vehicle is driving, and/or a roadway type.

* * * * *